US012240243B2

(12) United States Patent
Gerstner et al.

(10) Patent No.: US 12,240,243 B2
(45) Date of Patent: Mar. 4, 2025

(54) DEVICE AND METHOD FOR EVACUATION OF INK VAPOR

(71) Applicant: Canon Production Printing Holding B.V., Venlo (NL)

(72) Inventors: Albrecht Gerstner, Oberbergkirchen (DE); Frank Freudenberg, Rattenkirchen (DE); Christian Kürmeier, Erding (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 18/248,935

(22) PCT Filed: Apr. 7, 2022

(86) PCT No.: PCT/EP2022/059322

§ 371 (c)(1),
(2) Date: Apr. 13, 2023

(87) PCT Pub. No.: WO2022/214619

PCT Pub. Date: Oct. 13, 2022

(65) Prior Publication Data

US 2023/0382118 A1 Nov. 30, 2023

(30) Foreign Application Priority Data

Apr. 8, 2021 (DE) ..................... 10 2021 108 768.6

(51) Int. Cl.
*B41J 2/17* (2006.01)

(52) U.S. Cl.
CPC ................................... *B41J 2/1714* (2013.01)

(58) Field of Classification Search
CPC ...................................................... B41J 2/1714
See application file for complete search history.

(56) References Cited

U.S. PATENT DOCUMENTS

| | | | | |
|---|---|---|---|---|
| 8,177,316 | B2 * | 5/2012 | Muto | B41J 11/0022 347/102 |
| 8,783,826 | B2 | 7/2014 | Koike et al. | |
| 10,155,390 | B2 * | 12/2018 | Kearns | B41J 11/0022 |
| 2015/0085014 | A1 | 3/2015 | Ishida et al. | |
| 2016/0271950 | A1 | 9/2016 | Imahashi et al. | |
| 2016/0271952 | A1 | 9/2016 | Arimizu et al. | |
| 2017/0217192 | A1 * | 8/2017 | Imahashi | B41J 2/16523 |
| 2018/0001648 | A1 | 1/2018 | Kearns et al. | |

FOREIGN PATENT DOCUMENTS

| | | | |
|---|---|---|---|
| EP | 3072695 | A1 | 9/2016 |
| EP | 3081382 | A1 | 10/2016 |
| JP | 2010143060 | A | 7/2010 |
| JP | 2010201874 | A | 9/2010 |
| JP | 2010284892 | A | 12/2010 |
| JP | 5918986 | B2 | 4/2016 |

OTHER PUBLICATIONS

ISR and WO issued in PCT/EP2022/059322 on Apr. 7, 2022.
Office Action issued in DE102021108768.6 on Jan. 14, 2022.

* cited by examiner

*Primary Examiner* — Scott A Richmond
(74) *Attorney, Agent, or Firm* — The Webb Law Firm

(57) ABSTRACT

Provided is an evacuation device for an inkjet printing device that is designed to guide a printed recording medium along a transport direction through a constriction with an opposite gas flow, in order to be able to efficiently and comprehensively evacuate ink vapor before the constriction, in terms of the transport direction.

14 Claims, 5 Drawing Sheets

DEVICE AND METHOD FOR EVACUATION OF INK VAPOR

CROSS-REFERENCE TO RELATED APPLICATIONS

This application is the United States national phase of International Application No. PCT/EP2022/059322 filed Apr. 7, 2022, and claims priority to German Patent Application No. 10 2021 108 768.6 filed Apr. 8, 2021, the disclosures of which are hereby incorporated by reference in their entireties.

BACKGROUND OF THE INVENTION

Field of the Invention

The invention relates to a device and a corresponding method for evacuation of ink vapor.

Description of Related

Inkjet printing devices may be used for printing to recording media, for example paper. For this purpose, in a print group or printing device, one or more nozzles are used in order to fire ink droplets onto the recording medium and thus generate a desired print image on the recording medium. An inkjet printing device also typically comprises a drying unit in order to dry the recording medium after application of the print image, and in order to thereby fix the applied ink on the recording medium.

Upon printing to the recording medium, an ink vapor, i.e. an aerosol with ink particles, may be created in the print group, which ink vapor may be transported from the recording medium into the drying unit and there may lead to fouling.

JP 2010-284 892 A, JP 2010-143 060 A, JP 2010-201 874 A, and US 2016/0271950 A1 disclose an evacuation device for ink vapor in an inkjet printing system, wherein the evacuation device is downstream of a constriction after the print group, in terms of the printing device. It is hereby disadvantageous that fouling possibilities for the recording medium and the printing system exist between the print group and the evacuation device.

US 2018/0001648 A1 discloses an evacuation device for ink vapor in an inkjet printing system, wherein the evacuation device is arranged at the same position as a blower, in terms of the transport direction.

SUMMARY OF THE INVENTION

The present document deals with the technical object of efficiently and reliably reducing or preventing fouling caused by ink vapor. The object is respectively achieved as described herein.

According to a first aspect of the invention, an evacuation device for evacuation of ink vapor in an inkjet printing device is described, wherein the printing device has a print group for printing to a front side of a recording medium, in particular a belt-shaped recording medium, moving along a transport direction through the print group. The evacuation device comprises a mechanical barrier that is designed to form a constriction above the front side of the recording medium directed past the mechanical barrier in the transport direction, which front side has been printed to in the print group. The constriction forms a tunnel for the recording medium and has an extent of less than mm in the transport direction. Furthermore, the evacuation device comprises a blower that is designed to produce a gas flow traveling counter to the transport direction in the constriction above the printed front side of the recording medium. The evacuation device also comprises an evacuation unit that is configured to evacuate ink vapor from the printed front side of the recording medium, said ink vapor being in an evacuation region that is arranged before the constriction with respect to the transport direction. For this purpose, the evacuation device may be arranged before the constriction, especially above the evacuation region.

According to a further aspect, a method is described for evacuation of ink vapor in an inkjet printing device, wherein the printing device comprises a print group for printing to a front side of a recording medium moving through the print group along a transport direction. The method comprises the guidance of the recording medium along the transport direction through a mechanical constriction arranged above the front side of said recording medium. The method also comprises the effecting of a gas flow that, in the constriction, travels counter to the transport direction above the printed front side of the recording medium. Moreover, the method comprises the evacuation of ink vapor from the printed front side of the recording medium in an evacuation region that is arranged before the constriction, with respect to the transport direction.

In that the constriction has an extent of less than 25 mm in the transport direction, via the gas flow or purge air it may be effectively prevented that ink vapor may penetrate into the region of the constriction.

In an especially advantageous embodiment, the constriction has an extent in the transport direction of less than 15 mm, preferably less than 5 mm, even more preferably of less than 2 mm. This is advantageous since, the smaller the extent of the constriction in the transport direction, the more effectively that a penetration of ink vapor from a boundary air layer in proximity to the recording medium into the region of the constriction may be prevented.

It is thereby expedient that the mechanical barrier extends, in the transport direction, from the constriction as a ramp with increasing clearance from the recording medium, in order to direct a gas flow of the blower counter to the transport direction at the constriction. This provides an effective possibility in order to keep the ink vapor away from the constriction.

In particular, the mechanical barrier counter to the transport direction terminates after the constriction, so that the gas flow of the blower counter to the transport direction leads to turbulent air eddies after the constriction, so that air from the boundary air layer is entrained vertically with respect to the transport direction, whereby the laminar-flowing boundary air layer separates from the recording medium. In this way, a significantly greater portion of the ink vapor may be directed to the evacuation device and removed, in comparison to the prior art.

Alternatively, it is conceivable that the mechanical barrier extends after the constriction, counter to the transport direction, in a rounded manner as a ramp with increasing clearance from the recording medium, so that the gas flow of the blower after the constriction flows in a laminar manner along the rounded shape with increasing vertical distance from the recording medium, and thus air from the boundary air layer is entrained vertically with respect to the transport direction and the laminar-flowing boundary air layer separates from the recording medium. In this way as well, a significantly greater portion of the ink vapor may be directed to the evacuation device and removed, in comparison to the prior art.

The mechanical barrier preferably extends from the constriction, in the transport direction, as a ramp with rounded shape having increasing clearance. This and other ramp shapes allow an efficient supply of the gas flow from the blower to the constriction.

In particular, the printing device has a printing width transverse to the transport direction, across which printing width the front side of the recording medium is printed to in the print group. It is even more expedient if the constriction extends across the entire printing width of the printing device. Nearly the entirety of the ink vapor may thus be removed from the boundary air layer around the recording medium.

In an advantageous embodiment, the gas flow produced by the blower is designed such that the ink vapor in the evacuation region, in particular directly at the front side of the recording medium, has a movement velocity in the transport direction that is less, in particular less by a factor of 2 or more, than a transport velocity of the recording medium. Empirically, an especially large quantity of ink vapor may be removed from the boundary air layer in this way.

The blower is expediently configured to supply the gas flow to the constriction through an air channel with a thickness of between 0.1 mm and 1 mm, so that the gas flow forms an air knife. The sharp, fast, and narrow gas flow that emerges from the very narrow slot of the outflow region of the "air knife" moves, according to the Coandă effect, around the thickness of the air knife, counter to the transport direction of the recording medium. On the outgoing side of the constriction, a large quantity of ambient air is thereby additionally entrained from the boundary air layer in proximity to the recording medium. In the event that it may occur that small quantities of the aerosol vapor or ink vapor that moves in the transport direction in the boundary layer of the web still travel through the constriction, said vapor is immediately entrained with the air jet moving counter to the transport direction and transported to before the constriction again. On the incoming side of the web, the aerosols or ink vapor droplets arrive in the boundary air layer with the printed medium, but cannot pass the closure due to the gas flow in the constriction. Depending on the design of the mechanical barrier, in the constriction or thereafter the air jet of the air knife moves, counter to the transport direction, either in a laminar manner along a wall or in turbulent eddies, such that air above the recording medium is entrained upward. If the mechanical barrier terminates counter to the transport direction after the constriction, the gas flow after the constriction causes turbulent eddies. If the mechanical barrier extends after the constriction in a rounded manner, as a ramp with increasing clearance, the gas flow of the blower thus flows after the constriction in a laminar manner along the rounded shape. This thus flows with increasing vertical clearance from the recording medium, so that air from the boundary air layer is entrained vertically with respect to the transport direction.

The sharp, fast, and narrow gas flow that emerges from the very narrow slot of the outflow region of the "air knife" moves, according to the Coandă effect, counter to the transport direction. Ambient air is thereby additionally entrained from a position that is downstream of the air channel in the transport direction. In the event that small quantities of the aerosol vapor pass from the boundary air layer into the constriction, this aerosol vapor is immediately entrained with the air jet moving counter to the transport direction and transported to before the constriction again.

The aerosol-containing air is thus superlatively removed from the boundary air layer at the recording medium and transported with the air jet away from the recording medium.

A suitable evacuation device may take up the aerosol-containing air and supply it to a suitable disposal.

The gap height between the recording medium and an outlet point of the air channel is preferably between 0 and 25 mm, preferably between 1 and 10 mm, even more preferably between 1 and 5 mm. In this way, a particularly efficient effect on the boundary air layer at the recording medium may be achieved.

In particular, the air channel forms an angle of between 10° and 80°, preferably between 20° and 70°, even more preferably between 30° and 60° with respect to the transport direction. An angle of 45° has proven to be particularly expedient.

BRIEF DESCRIPTION OF THE DRAWINGS

In the following, exemplary embodiments of the invention are described in detail using the schematic drawing. Thereby shown are.

DESCRIPTION OF THE INVENTION

Figure 1A:
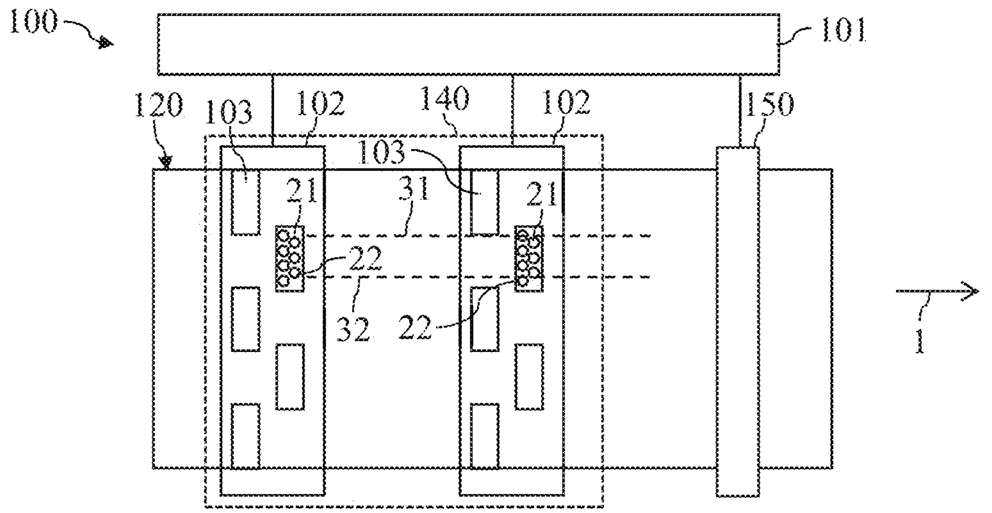
FIG. 1*a* a block diagram of an example of an inkjet printing device comprising a drying or fixing unit.

The printing device 100 depicted in FIG. 1*a* is designed for printing to a recording medium 120 in the form of a sheet or page or plate or belt. The recording medium 120 may be produced from paper, paperboard, cardboard, metal, plastic, textiles, a combination thereof, and/or other suitable and printable materials. The recording medium 120 is guided through the print group 140 of the printing device 100 along the transport direction 1, represented by an arrow.

In the depicted example, the print group 140 of the printing device 100 comprises two print bars 102, wherein each print bar 102 may be used for printing with ink of a defined color, for example black, cyan, magenta, and/or yellow, and MICR ink if applicable. Different print bars 102 may be used for printing with respective different inks. Furthermore, the printing device 100 comprises at least one fixing or drying unit 150 that is configured to fix a print image printed on the recording medium 120.

A print bar 102 may comprise one or more print heads 103 that, if applicable, are arranged side by side in a plurality of rows in order to print the dots of different columns 31, 32 of a print image onto the recording medium 120. In the example depicted in FIG. 1*a*, a print bar 102 comprises five print heads 103, wherein each print head 103 prints the dots of a group of columns 31, 32 of a print image onto the recording medium 120.

In the embodiment depicted in FIG. 1*a*, each print head 103 of the print group 140 comprises a plurality of nozzles 21, 22, wherein each nozzle 21, 22 is configured to fire or eject ink droplets onto the recording medium 120. A print head 103 of the print group 140 may, for example, comprise multiple thousands of effectively utilized nozzles 21, 22 that are arranged along a plurality of rows transverse to the transport direction 1, i.e. along the printing width, of the recording medium 12. By means of the nozzles 21, 22 of a print head 103 of the print group 140, dots of a line of a print image may be printed onto the recording medium 120 transverse to the transport direction 1, i.e. along the width of the recording medium 120.

The printing device 100 also comprises a control unit 101, for example a control hardware and/or a controller, that is configured to control the actuators of the individual nozzles 21, 22 of the individual print heads 103 of the print group 140 in order to apply the print image onto the recording medium 120 depending on print data. For each nozzle 21, 22—i.e. for each column 31, 32 of the print image—and for each line of the print image, the print data respectively indicate whether an ink ejection should take place or not, and if applicable what ink quantity should be ejected.

The print group 140 of the printing device 100 thus comprises at least one print bar 102 with K nozzles 21, 22 that may be controlled with a defined line timing in order to print a line, which travels transverse to the transport direction 1 of the recording medium 120, with K pixels or K columns 31, 32 of a print image onto the recording medium 120, for example with K>1000. In the depicted example, the nozzles 21, 22 are installed so as to be immobile or fixed in the printing device 100, and the recording medium 120 is directed past the stationary nozzles 21, 22 with a defined transport velocity.

Figure 1B:
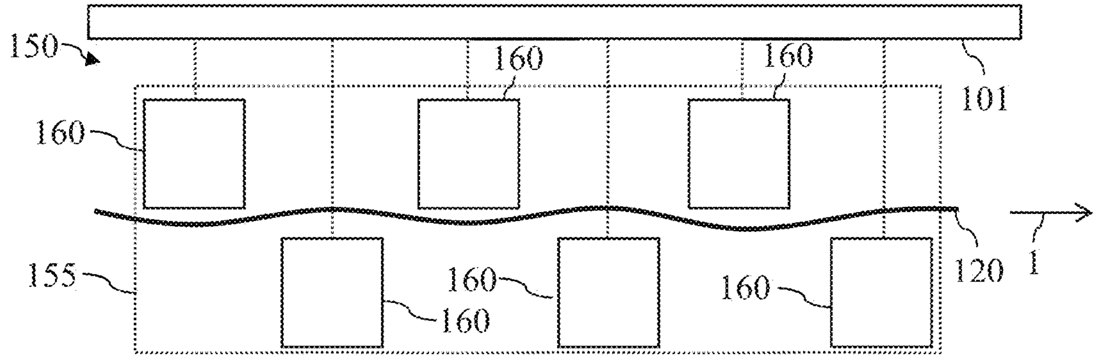
FIG. 1*b* a block diagram of an example of a drying unit for an inkjet printing device.

As presented above, the printing device 100 may comprise a drying unit 150 that is configured to dry the recording medium 120 after application of the ink by the one or more print bars 102, and therewith to fix the applied print image on the recording medium 120. The drying unit 150 depicted in FIG. 1*b* comprises a plurality of drying modules 160 that are arranged along a drying route on both sides of the recording medium 120 (typically in the form of a web) and that are respectively configured to blow a gaseous drying medium, typically heated air, onto the surface of the recording medium 120. The drying route with the drying modules 160 is thereby arranged in a housing 155 of the drying unit 150. By being blown on with a gaseous drying medium, the print image on a recording medium 120 may be dried more gently and reliably along the drying route of the drying unit 150.

Figure 1C:
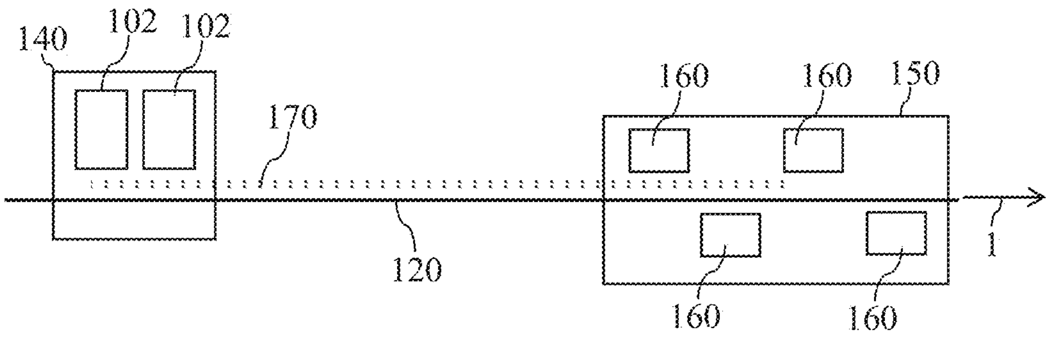
FIG. 1*c* an example of an inkjet printing device in a side view.

During the printing operation, an ink vapor that comprises color pigments of the one or more different inks with which printing occurs in the print group 140 is typically created in said print group 140. As depicted by way of example in FIG. 1*c*, the ink vapor 170 may be entrained by the recording medium 120 along the transport direction 1. In particular, the ink vapor 170 may be transported from the print group 140 into the following drying unit 150. The ink vapor 170 may then lead to fouling in the housing 155 of the drying unit 150, in particular at the one or more drying modules 160, wherein the quality of the drying of the recording medium 120 may be negatively affected by the fouling.

Figure 2:
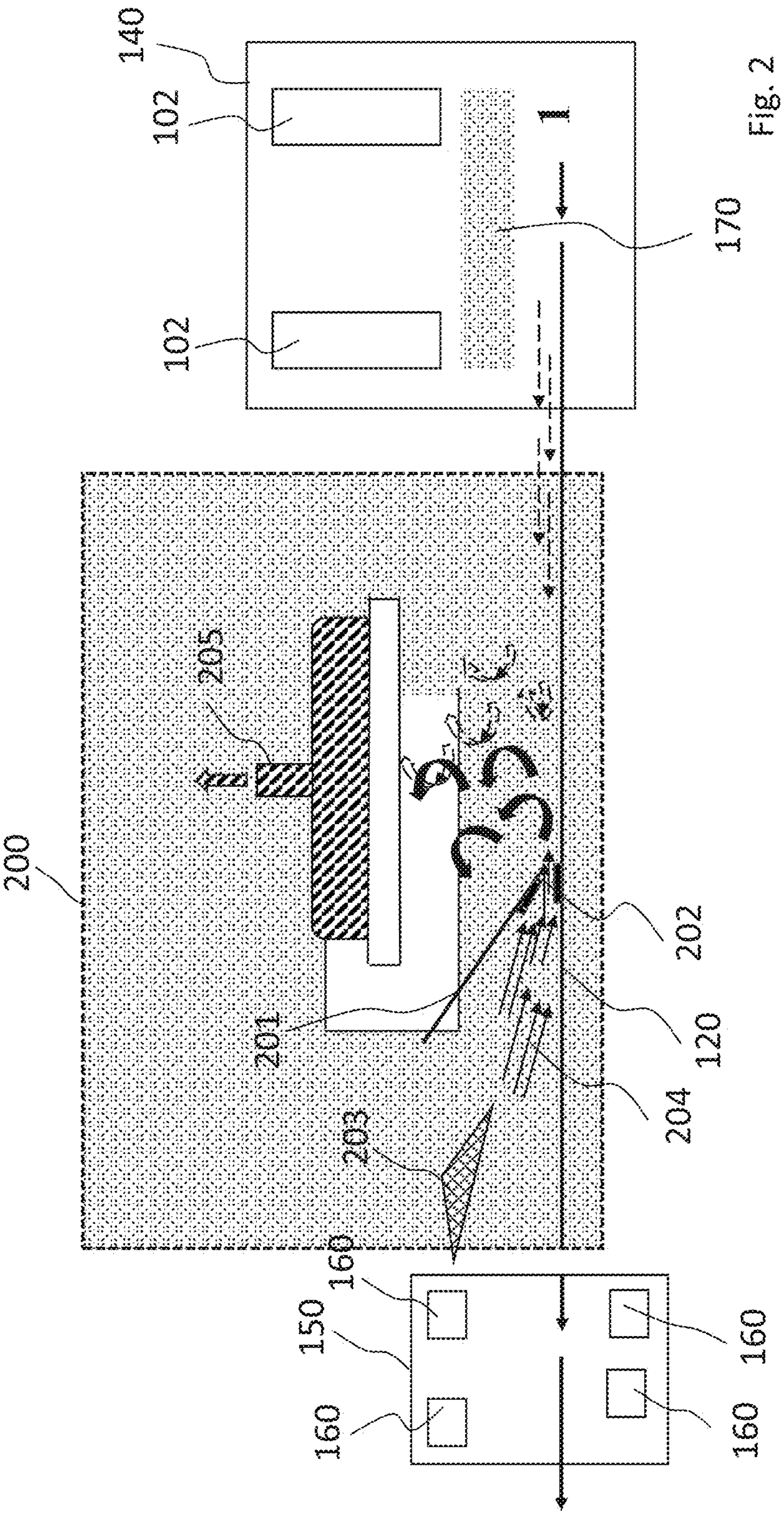
FIG. 2 an example of an evacuation device for an inkjet printing device.

FIG. 2 shows an example of an evacuation device 200 that is arranged after the print group 140 and/or before the drying unit 150, with respect to the transport direction 1. The evacuation device 200 comprises a mechanical barrier 201 that forms a mechanical constriction 202 through which the recording medium 120 is guided. The constriction 202 may have a height orthogonal to the surface of the recording medium 120, in particular orthogonal to the front side of the recording medium 120, that on the one hand is optimally small in order to permit only an optimally small fraction of the ink vapor 170 entrained with the recording medium 120, but on the other hand is sufficiently large to prevent collisions with the recording medium 120. The constriction 202 may, for example, have a height of between 1 and 12 mm, preferably between 1 and 3 mm.

Furthermore, the constriction 202 may have a defined length in the transport direction 1, so that the constriction 202 forms a tunnel for the recording medium 120. According to the invention, the constriction 202 has a length that is markedly less than 25 mm. In particular, it is advantageous if the length is less than 15, more preferably less than 10 mm, in particular is less than 5 mm. Via the provisioning of a constriction 202 that has a defined maximum length in the transport direction 1, a turbulent air eddy or a laminar flow stall of the boundary air layer is generated. The mechanical barrier 201 preferably extends, in the transport direction 1, from the constriction 202 as a ramp with increasing clearance. A gas flow 204 from the blower is thus directed to the constriction 202. In this embodiment, the mechanical barrier 201 terminates after the constriction 202 so that the gas flow 204 of the blower 203 leads to turbulent air eddies counter to the transport direction 1 after the constriction. In this way, air from the boundary air layer is entrained vertically with respect to the transport direction, whereby the laminar-flowing boundary air layer separates from the recording medium 120.

The evacuation device 200 also comprises a blower 203 that is designed to produce a gas flow 204 at the exit of the constriction 202, which gas flow 204 is opposite to the transport direction 1. In this document, the gas flow 204 is also referred to as a blockade gas flow 204, since the gas flow 204 is designed to block the ink vapor 170 entrained by the recording medium 120 in a boundary air layer at the constriction 202, and to separate this boundary air layer—including ink vapor 170—vertically from the transport direction. The blower 203 may be arranged after the constriction 202, in particular after the exit of the constriction 202. The blower 203 thereby travels transverse to the transport direction of the substrate and covers at least the width of the substrate.

Furthermore, the evacuation device 200 comprises an evacuation unit 205 that is configured to evacuate the ink vapor 170 before the constriction 202. The evacuation unit 205 may be arranged before the constriction 202, especially before the entrance to the constriction 202. The evacuation unit 205 may also be separate from the mechanical barrier 201 for forming the constriction 202. Via the blockade gas flow 204, the effect is produced that the ink vapor 170 at the entrance to the constriction 202 and/or before the constriction 202 separates with an air movement of the blockade gas flow 204, vertically with respect to the transport direction, so that the ink vapor 170 may be efficiently evacuated via an evacuation unit 205 arranged before the constriction 202. This may also be effected by a relatively small volumetric suction flow, and/or by a relatively small suction power. The evacuation unit 205 may thereby have a relatively large evacuation opening, similar to a fume hood, in order to evacuate the ink vapor 170 over a large area.

Via the evacuation device 200 depicted in FIG. 2, it may be reliably avoided that the ink vapor 170 fouls the subsequent drying unit 150.

An ink vapor evacuation 200 arranged between the one or more print heads 103 and the fixing 150 is thus described. The evacuation 200 comprises a mechanical constriction 202 that is formed by a mechanical barrier 201, wherein the mechanical barrier 201 prevents at least a portion of the air contaminated with ink vapor 170 from being transported from the recording medium 120 into the dryer 150. Typically, the smaller the gap formed by the constriction 202, and/or the greater the transport velocity of the recording medium 120, the more effective the constriction 202. The gap of the constriction 202 typically may not thereby be made arbitrarily small, in order to take into account tolerances, a defined ripple of the recording medium 120, and/or adhesive joints of the recording medium 120.

To further increase the effectiveness, an opposite purge air flow 204 may be generated that is opposite the travel direction 1 of the recording medium 120. The purge air flow 204 may be generated by a blower 203, in particular by what is known as an air knife. An air flow 204 is thereby generated that is travels opposite the transport direction 1 into the constriction 202 and, if applicable, flows through said constriction 202. It may thus be reliably effected that the boundary air layer at the recording medium 120 that has the ink vapor 170 is hindered from flowing through the constriction 202. An escape of ink vapor 170 at the exit of the constriction 202 may thus be prevented by the purge air current 204. In particular, via the purge air current 204 it may be effected that the constriction 202 appears to the boundary air layer to be narrower, and an increased fraction of the boundary air layer is thereby stripped away or separated at the constriction 202. The effective efficiency of the constriction 202 may thus be increased.

The evacuation device 200 is thus designed so that air or a gas flows in the opposite direction through a constriction 202 in order to therewith "virtually" reduce the clearance or the height of the constriction 202. The goal may thus be achieved that (ink) particles and/or aerosols entrained with the recording medium 120 split off above said recording medium 120 and are prevented from being transported further with the recording medium 120.

Via the constriction 202 and via the purge air 204, the quantity of ink vapor 170 that is transported into the drying unit 150 may be reduced. In order to avoid fouling of the printing device 100 and/or of the environment of the printing device 100 by aerosols, the ink vapor 170 is evacuated by an evacuation unit 205 that is arranged before the constriction 202. The evacuation unit 205 may thereby be flexibly arranged in spatial proximity to, or even relatively far away from, the constriction 202. A particularly efficient and comprehensive evacuation before the constriction 202 may thus be enabled.

In that the constriction is preferably kept very short, i.e. with a length of from 0.1 mm to 10 mm, and the mechanical barrier 201 terminates counter to the transport direction 1 after the constriction 202, air eddies and turbulences counter to the transport direction are generated downstream of the constriction, which eddies and turbulences lead to the situation that the boundary air layer with the aerosols separates from the recording medium and thus may be better evacuated by the evacuation unit 205.

Figure 3:
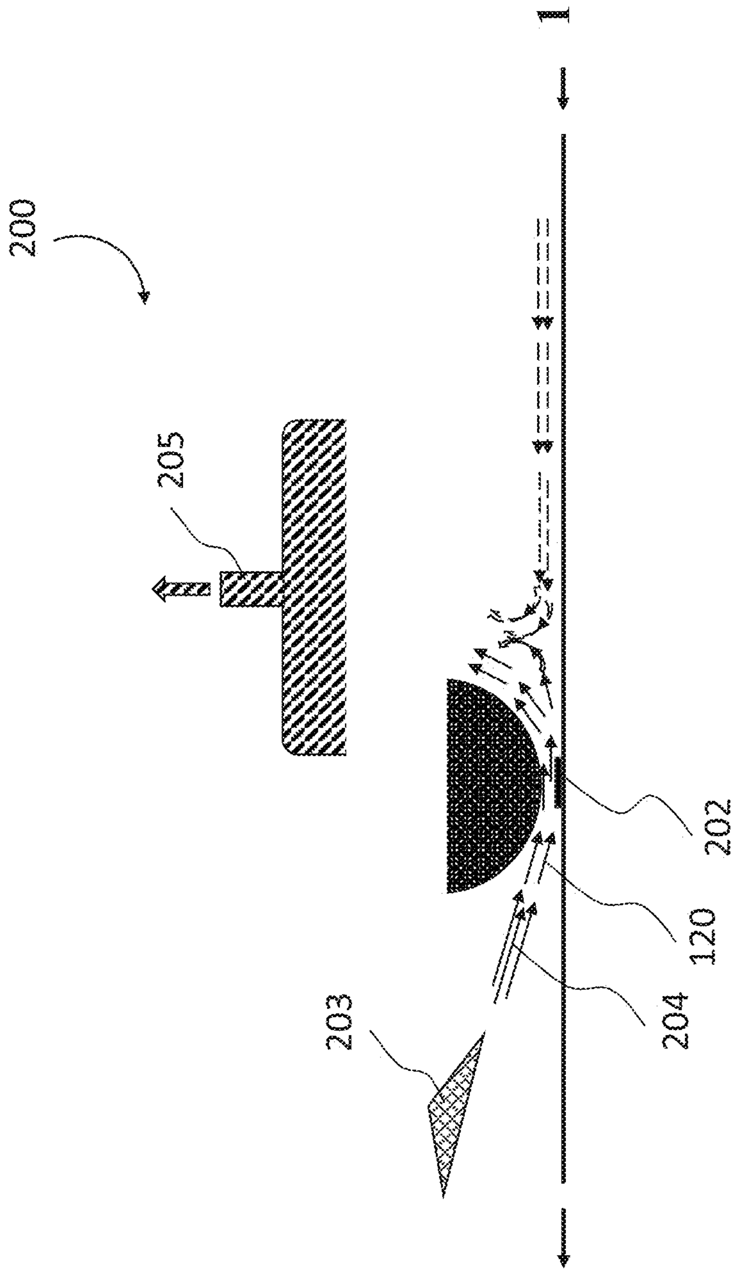
FIG. 3 an alternative example of an evacuation device for an inkjet printing device.

FIG. 3 shows an alternative embodiment of an evacuation device 200. After the constriction 202, the mechanical barrier 201 hereby extends counter to the transport direction as a rounded ramp with increasing clearance. In this way, the gas flow of the blower after the constriction flows in a laminar manner along the rounded shape with increasing clearance from the recording medium 120. Here as well, air from the boundary air layer is entrained vertically with respect to the transport direction 1, so that the laminar-flowing boundary air layer separates from the recording medium 120. Furthermore, the mechanical barrier 201 extends in the transport direction from the constriction 202 as a rounded ramp with increasing clearance. A gas flow 204 is thus directed from the blower 203 to the constriction 202.

Figure 4:
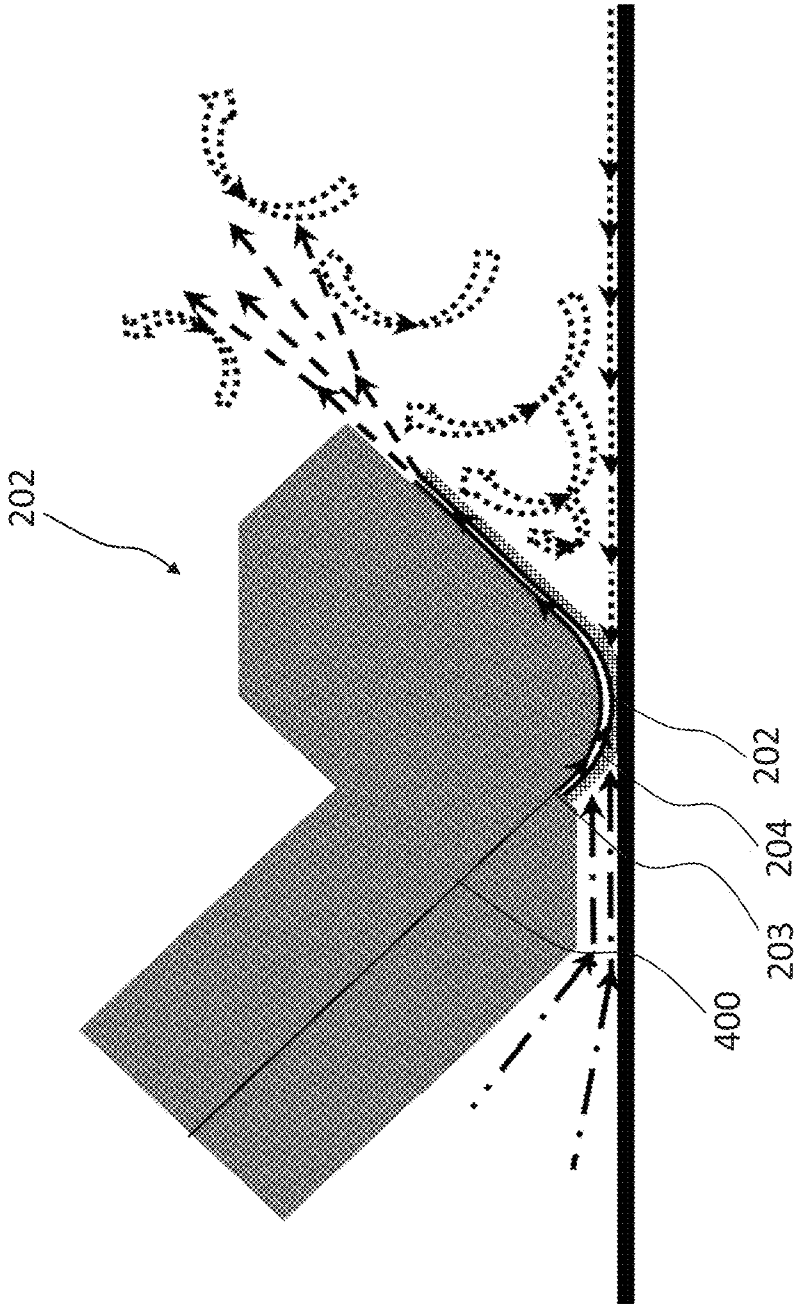
FIG. 4 a further alternative example of an evacuation device for an inkjet printing device.

FIG. 4 shows a further alternative embodiment of an evacuation device 200. In this instance, the blower is configured to supply the gas flow to the constriction via an air channel 400 having a thickness of between 0.1 mm and 1 mm, so that the gas flow 204 forms an air knife. In this embodiment, the mechanical barrier 204 extends from the constriction 202 in the transport direction 1 as a ramp with a rounded shape having increasing clearance from the recording medium 120. Here the air channel is positively connected to one end of the ramp in the transport direction 1 so that the blower 203 produces a gas flow 204 in a laminar manner parallel to the ramp. This gas flow 204 along the rounded ramp forms what is known as a "Coandă flow." This consists of a boundary layer; a relatively thin, undisturbed air layer; the jet that flows along the ramp; then an additional friction layer with respect to the air masses outside of the Coandă jet. The air outside is at rest, which is why there is no pressure increase in accordance with Bernoulli's principle. Therefore, the Coandă flow adheres longer than a normal flow to the ramp along which it flows. In this way, the boundary air layer at the recording medium 120 is entrained vertically relative to the transport direction 1 and may be evacuated.

Figure 5:
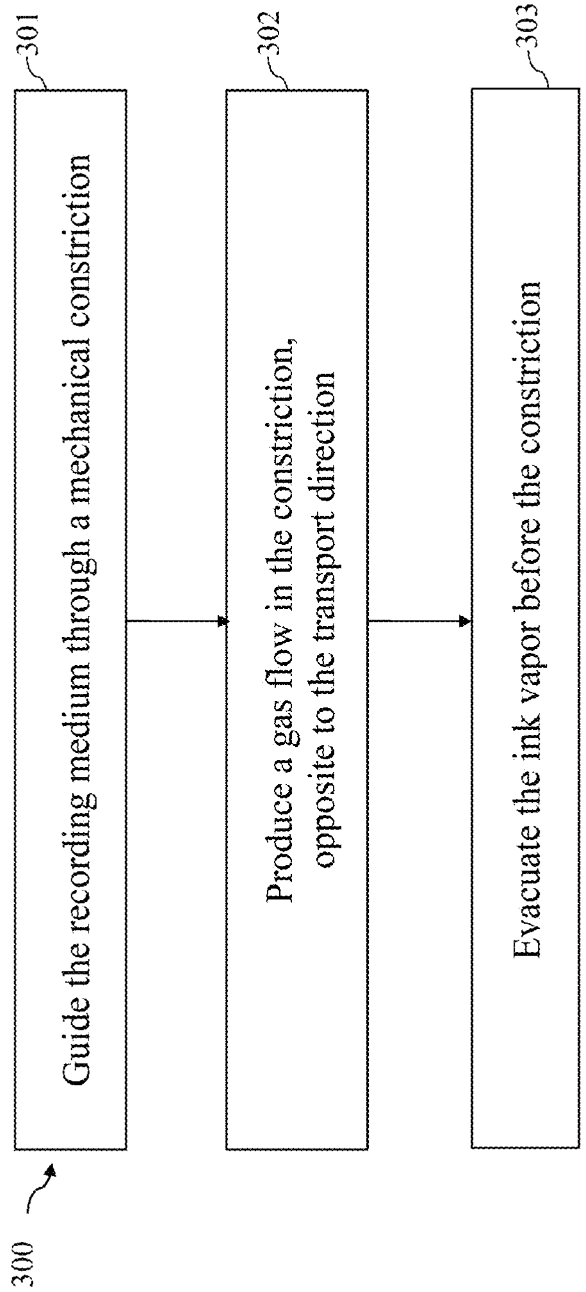
FIG. 5 a workflow diagram of an example of a method for evacuating ink vapor in an inkjet printing device.

FIG. 5 shows a workflow diagram of a method 300 for evacuating ink vapor 170 in an inkjet printing device 100. The printing device 100 comprises a print group 140 for printing to the front side of a recording medium 120 moved through the print group 140 along a transport direction 1.

The method 300 comprises the guidance 301 of the recording medium 120 along the transport direction 1 through a constriction 202 arranged above the front side of the recording medium 120. The constriction 202 may thereby have a height of 2-12 mm. The constriction 202 may be designed to limit the layer with ink vapor 170, said layer being entrained with the recording medium 120 on the front side of said recording medium 120, to a defined layer thickness via a mechanical and/or structural blockade. The layer thickness may thereby correspond to the height of the constriction 202.

Furthermore, the method 300 comprises effecting 302 a gas flow 204, especially an air flow, that in the constriction 202 travels counter to the transport direction 1 above the printed front side of the recording medium 120. The gas flow 204 may be particularly efficiently produced by a blower 203 arranged after the constriction 202, with respect to the transport direction 1. The gas flow 204 may be designed to further reduce the effective layer thickness of the layer with ink vapor 170 on the front side of the recording medium 120, especially to reduce it by 50% or more or by 80% or more.

The method 300 also comprises the evacuation 303 of ink vapor 170 from the printed front side of the recording medium 120 in an evacuation region that is arranged before the constriction 202, with respect to the transport direction 1. The ink vapor 170 may be evacuated by an evacuation unit 205 that is arranged before the constriction 202. The combined use of a mechanical constriction 202 with an opposing gas flow 204 within the constriction 202 thereby enables an efficient and comprehensive evacuation of the ink vapor 10 in the evacuation region before the constriction 202.

An evacuation device 200 for evacuating ink vapor 170 in an inkjet printing device 100 is thus described in this document. As described in conjunction with FIG. 1*a*, the printing device 100 may comprise a print group 140 for printing to the front side of a recording medium 120 moving through the print group 140 along a transport direction 1. The print group 140 may comprise one or more print bars 102 and/or print heads 103 that are designed to apply ink droplets onto the front side of the recording medium 120.

Within the scope of the printing process, in the print group 140 ink vapor 170 may be generated that is entrained by the recording medium 120, moving in the transport direction 1, in an ink vapor layer on the front side of the recording medium 120.

The evacuation device 200 comprises a mechanical barrier 201 that is designed to form a structural constriction 202 above the front side of the recording medium 120 directed past the mechanical barrier 201 in the transport direction 1, said front side having been printed to in the print group 140. The constriction 202 may, for example, be formed by a plate that is arranged above the front side of the recording medium 120 and that, if applicable, travels parallel to the front side of the recording medium 120 along the transport direction 1.

Starting from the region facing toward the constriction 202, the mechanical barrier 201 may form a ramp that extends away from the front side of the recording medium 120 and along the transport direction 1. It may thus be reliably effected that the portion of the ink vapor layer skimmed off by the constriction 202 is directed away from the recording medium 120. A particularly reliable evacuation of the ink vapor 170 may thus be enabled in an evacuation region before the constriction 202.

The mechanical barrier 201 may, for example, comprise a plate that initially extends parallel to the recording medium 120, along the transport direction 1, in order to form the constriction 202, and that—starting from the exit of the constriction 202—extends away from the recording medium 120 in order to form the ramp.

The constriction 202 formed by the mechanical barrier 201 may have a length of less than 25 mm, preferably less than 10 mm, even more preferably less than 5 mm, along the transport direction 1. Alternatively or additionally, the constriction 202 may form a tunnel for the recording medium 120, said tunnel traveling along the transport direction 1. The use of a constriction 202 that has a defined maximum expansion along the transport direction 1 enables a particularly comprehensive blockade and evacuation of the ink vapor 170.

The printing device 100 typically has a defined printing width, transverse to the transport direction 1, across which the front side of the recording medium 120 is printed to in the print group 140. The constriction 202 formed by the mechanical barrier 201 preferably extends over the entire printing width of the printing device 100. The ink vapor 170 generated in the print group 140 may thus be blocked and evacuated especially comprehensively.

The evacuation device 200 also comprises a blower 203 that is designed to produce a gas flow 204 traveling counter to the transport direction 1 in the constriction 202 above the printed front side of the recording medium 120. The blower 203, in particular what is known as the air knife, may be arranged at the exit of the constriction 202, with respect to the transport direction 1, and may be designed to produce a gas flow 204—especially an air flow—that travels from the exit in the direction of the entrance to the constriction 202. The gas flow 204 produced by the blower 203 may thereby be designed to push ink vapor 170 that has been entrained by the front side of the recording medium 120 in the transport direction 1, from the entrance to the constriction 202 in the direction of the exit from the constriction 202, back in the direction of the entrance to the constriction 202. It may thus be reliably effected that ink vapor 170 is blocked at the mechanical barrier 201, and thus cannot pass into a component 150 of the printing device 100 that is downstream of the evacuation device 200.

The gas flow 204 produced by the lower 203 may especially be designed such that the ink vapor 170 in the evacuation region before the constriction 202, especially directly at the front side of the recording medium 120, has a movement velocity in the transport direction 1 that is less, in particular less by a factor of 2 or more, than the transport velocity of the recording medium 120. Via the gas flow 204, it may thus be effected that the ink vapor layer at the front side of the recording medium 12 is slowed before the entrance to the constriction 202 in order to reliably reduce the quantity of ink vapor 170 that traverses the constriction 202.

Alternatively or additionally, the gas flow 204 produced by the blower 203 may be designed to reduce, relative to the actual cross-sectional area of the constriction 202, the effective cross-sectional area of the constriction 202 orthogonal to the front side of the recording medium 120 via which ink vapor 170 can flow through the constriction 202, especially to reduce said effective cross-sectional area by 50% or more, or by 80% or more. The gas flow 204 thus enables a relatively high constriction 202 to be used in order to reliably avoid a collision between the recording medium 120 and the mechanical barrier 201, and to nevertheless thereby produce a reliable separation of the ink vapor 170.

Overall, the evacuation device 200 may be designed to have the effect that at most 10% of the ink vapor 170 guided from the recording medium 120 to the entrance to the constriction 202 exits from the exit of the constriction 202. This may be reliably effected via the combination of a mechanical and/or structural constriction 202 and an opposite gas flow 204.

The evacuation device 200 also comprises an evacuation unit 205 that is configured to evacuate ink vapor 170 from the printed front side of the recording medium 120 in an evacuation region that is arranged before the constriction 202 with respect to the transport direction 1. For this purpose, the evacuation unit 205 is arranged before the constriction 202. The evacuation unit 205 also preferably has a suction opening facing toward the front side of the recording medium 120, which suction opening expands toward the front side of the recording medium 120 and/or tapers with increasing distance from the front side of the recording medium 120. An especially efficient and comprehensive evacuation of the ink vapor 170 may thus be effected in the evacuation region before the constriction 202.

An evacuation device 200 for an inkjet printing device 100 is thus described that is designed to guide a printed recording medium 120 along a transport direction 1 through a mechanical constriction 202 having an opposite gas flow 204, in order to be able to efficiently and comprehensively evacuate ink vapor 170 before the constriction 202, in terms of the transport direction 1.

Furthermore, in this document a printing device 100 is described that comprises the evacuation device 200 described in this document.

Via the measures described in this document, the ink vapor 170 generated in a print group 140 can be reliably remedied, especially in order to prevent a fouling of downstream components such as a drying unit 150.

REFERENCE LIST

1 transport direction
21, 22 nozzle (print group)
31, 32 column (of the print image)
100 printing device
101 control unit
102 print bar
103 print head
120 recording medium
140 print group
150 fixing or drying unit
155 housing (drying unit)
170 ink vapor
200 evacuation device
201 mechanical barrier
202 gap/constriction/blockade location
203 blower
204 gas flow
205 evacuation unit
300 method for evacuating ink vapor
301-303 method steps
400 air channel

The invention claimed is:

1. An evacuation device for evacuating ink vapor in an inkjet printing device; wherein the printing device comprises a print group for printing to a front side of a recording medium moving through the print group along a transport direction; wherein the evacuation device comprises a mechanical barrier that is designed to form a constriction above the front side of the recording medium directed in the transport direction past the mechanical barrier, which front side has been printed to in the print group, wherein the constriction forms a tunnel for the recording medium and has an extent of less than 25 mm in the transport direction;

a blower that is designed to produce a gas flow traveling counter to the transport direction in the constriction above the printed front side of the recording medium; and an evacuation unit that is configured to evacuate ink vapor from the printed front side of the recording medium in an evacuation region that, with respect to the transport direction, is arranged before the constriction.

2. The evacuation device according to claim 1, wherein the constriction has an extent in the transport direction of less than 15 mm.

3. The evacuation device according to claim 1, wherein the mechanical barrier extends, in the transport direction, from the constriction as a ramp with increasing clearance from the recording medium, in order to direct the gas flow of the blower toward the constriction, counter to the transport direction.

4. The evacuation device according to claim 3, wherein the mechanical barrier terminates after the constriction, counter to the transport direction, so that the gas flow of the blower leads to turbulent air eddies after the constriction, counter to the transport direction, so that air from a boundary air layer is entrained vertically with respect to the transport direction.

5. The evacuation device according to claim 3, wherein the mechanical barrier, after the constriction, extends in a rounded manner as a ramp with increasing clearance from the recording medium, counter to the transport direction, so that the gas flow of the blower after the constriction flows in a laminar manner along the rounded shape with increasing vertical clearance from the recording medium, and thus air from a boundary air layer is entrained vertically with respect to the transport direction, and the laminar-flowing boundary air layer separates from the recording medium.

6. The evacuation device according to claim 3, wherein the mechanical barrier extends from the constriction in the transport direction as a ramp with a rounded shape having increasing clearance from the recording medium.

7. The evacuation device according to claim 1, wherein the blower is configured to supply the gas flow to the constriction via an air channel having a thickness of between 0.1 mm and 1 mm, so that the gas flow forms an air knife.

8. The evacuation device according to claim 7, wherein the air channel forms an angle of between 10° and 80° with respect to the transport direction.

9. The evacuation device according to claim 1, wherein the constriction has an extent in the transport direction of less than 5 mm.

10. The evacuation device according to claim 1, wherein the constriction has an extent in the transport direction of less than 2 mm.

11. The evacuation device according to claim 7, wherein the air channel forms an angle of between 20° and 70° with respect to the transport direction.

12. The evacuation device according to claim 7, wherein the air channel forms an angle of between 30° and 60° with respect to the transport direction.

13. A method for evacuation of ink vapor in an inkjet printing device; wherein the printing device comprises a print group for printing to a front side of a recording medium moving through the print group along a transport direction; wherein the method comprises the recording medium along the transport direction through a constriction arranged above the front side of the recording medium, which front side has been printed to in the print group; wherein the constriction forms a tunnel for the recording medium and has an extent of less than 25 mm in the transport direction;

producing a gas flow that travels above the printed front side of the recording medium, counter the transport direction, in the constriction; and evacuating ink vapor from the printed front side of the recording medium in an evacuation region that is arranged before the constriction with respect to the transport direction.

14. The method according to claim 13, that is executed with an evacuation device that comprises:

a mechanical barrier that is designed to form the constriction above the front side of the recording medium directed in the transport direction past the mechanical barrier;

a blower that is designed to produce the gas flow traveling counter to the transport direction in the constriction above the printed front side of the recording medium; and an evacuation unit that is configured to evacuate the ink vapor from the printed front side of the recording medium.

* * * * *